(No Model.)

B. EDGAR.
NUT LOCK.

No. 602,233. Patented Apr. 12, 1898.

Witnesses
J. G. Hinkel
William E. Neff

Inventor
Butler Edgar
By Watson & Watson Attorneys

UNITED STATES PATENT OFFICE.

BUTLER EDGAR, OF SUNBURY, PENNSYLVANIA, ASSIGNOR TO THOMAS M. RIGHTER, TRUSTEE, OF MOUNT CARMEL, PENNSYLVANIA.

NUT-LOCK.

SPECIFICATION forming part of Letters Patent No. 602,233, dated April 12, 1898.

Application filed June 9, 1897. Renewed March 8, 1898. Serial No. 673,146. (No model.)

*To all whom it may concern:*

Be it known that I, BUTLER EDGAR, a citizen of the United States, residing at Sunbury, in the county of Northumberland and State of Pennsylvania, have invented certain new and useful Improvements in Nut-Locks, of which the following is a specification.

This invention relates to improvements in devices for locking nuts to prevent them from becoming loose after they are screwed up against a railroad-splice or other part to be clamped.

The invention consists in providing the inner face of the nut, or the opposing face of the part to be clamped or against which the nut seats, with one or more tapering grooves which open at the side or periphery of the nut either at the larger end or at both ends, the nut being used in combination with small hard-metal balls which are dropped into one or more of the grooves after the nut has been screwed up tightly upon the splice or other article to be clamped by it. The grooves are preferably arranged tangentially upon the nut or substantially so.

I will describe the invention in detail in connection with the drawings accompanying this specification, in which—

Figure 1:
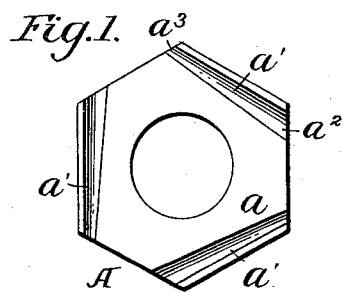
Figure 2:
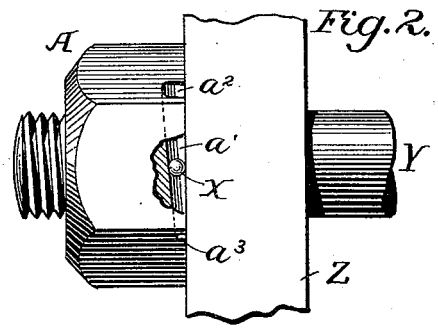
Figure 3:
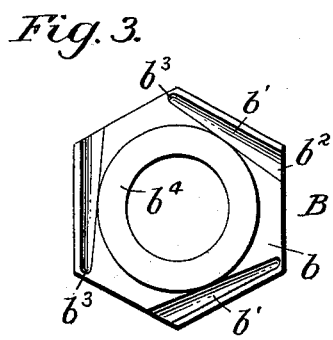
Figure 4:
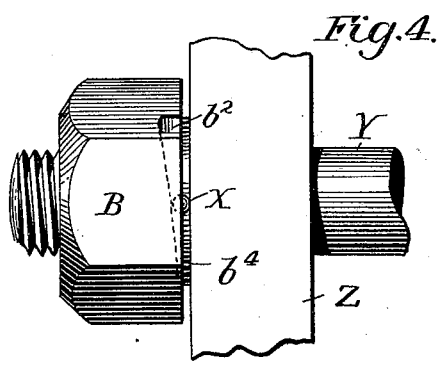
Figure 5:
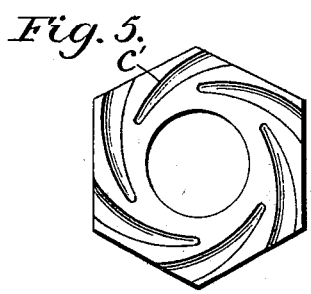
Figure 6:
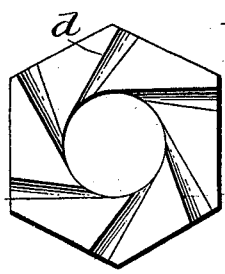
Figure 7:
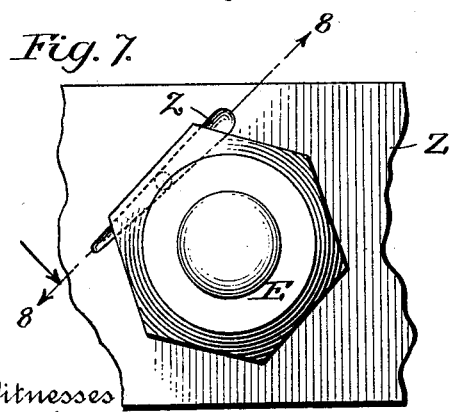
Figure 8:
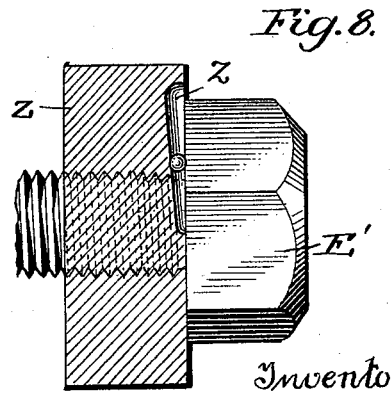

Figure 1 is a face view of a nut having three grooves. Fig. 2 is a side view of the same nut in operative position, part being broken away to show the ball which locks the nut. Figs. 3, 5, and 6 are face views of nuts, showing different forms of the invention. Fig. 4 is a side view of the nut shown in Fig. 3, showing the nut locked in operative position. Fig. 7 is a view of a modification; and Fig. 8 is a section, on the line 8 8 of Fig. 7, through part Z and showing a screw-head instead of a nut.

In Fig. 1 the face $a$ of the nut A is provided with three tapering grooves $a'$. These grooves are preferably curved or semicircular in cross-section. In this form of the invention the larger ends $a^2$ and smaller ends $a^3$ of the grooves open out on the sides of the nut. These grooves are substantially tangential to a circle drawn from the center of the nut. The larger ends of the grooves are large enough to receive a hardened-steel ball X of suitable size to lock the nut, and the groove is tapered so that the ball will normally lodge at or near its middle portion, as shown in Fig. 2. It will be evident that I may use one or more of these grooves. In most instances it will be preferable to use three or more of the grooves, so that the larger end of one groove will always be near the top of the nut and in position to receive a ball. I do not limit myself to any particular number of the grooves or to any particular cross-section of the same, although I have shown in the drawings the forms and dimensions which seem to me to be preferable. Neither do I limit myself to grooves which are exactly "tangential," but will use this term for convenience, as the grooves in all practical forms of the invention will be tangential to circles of larger or smaller radius or disposed in the general direction of tangents—as, for instance, those shown in Fig. 5.

The operation of the invention as shown in Figs. 1 and 2 is as follows: The nut, constructed as described, is placed upon the threaded bolt or rod Y and screwed up tightly against the plate or piece Z, which is the part to be clamped and which may be, for instance, a railroad-splice. After the nut is screwed up tightly a small steel ball X is dropped into the larger end of one of the grooves $a'$. After the ball is dropped into the groove it will be preferable to drive or press it down slightly with a nail or other suitable instrument; but this is not essential, especially in locking nuts or rail-joints, for the reason that the jarring caused by passing trains will cause the ball to settle as far as possible in the groove. Any attempt to turn the nut backward will immediately cause the ball to travel toward the smaller end of the groove, and the ball will lock the nut against backward movement. The nut will thus be locked against any accidental displacement. If, however, it is desired to remove the nut, it may be done quickly by inserting a wire into the smaller end of the groove and pushing the ball out. If the ball has become lodged solidly in the groove, the nut should be turned slightly forward before attempting to dislodge it. This will loosen the ball, and it may be pushed out easily.

In Fig. 3 I have shown a nut B having three tangential grooves $b'$ on its face $b$. These grooves are tapered, and their larger ends $b^2$ open on the sides of the nut. The smaller ends $b^3$ of the grooves may taper to nothing on the face of the nut instead of opening on the sides. Within the grooves $b'$ there is a raised annular shoulder $b^4$. This nut is shown in use in Fig. 4. The operation is the same as that of the nut shown in Fig. 2, excepting that when it is required to remove the nut a thin blade may be inserted between the face $b$ of the nut and the splice Z to raise the ball.

In Fig. 5 I have shown spirally-arranged grooves $c'$, which are tapered and have their outer ends opening upon the sides of the nut. In this view the nut is hexagonal and there are grooves opening upon all faces. This construction enables me to use two or three balls instead of one, if desired. The spiral grooves shown in this view are not strictly tangential, but they are disposed in the general direction of tangents, and it will be understood that these and other grooves disposed in substantially the same manner are included under the term "tangential" as used in the claims.

In Fig. 6 I have shown a form of the invention in which tapering grooves $d$ run from the outer faces of the nut to the inner opening, being tangential to the opening. As shown, their smaller ends are open to the threaded opening of the nut.

In Figs. 7 and 8 I have shown a modification of the invention which is practically a reversal of the forms shown in the preceding figures, the grooves $z$ being formed in the part Z instead of in the nut. In Fig. 7 a plain-faced nut E is shown coacting with the groove and ball, and in Fig. 8 a bolt or screw head E' is shown. The larger end of the groove projects beyond the periphery of the nut or head E E' to permit the ball to be inserted after the screw head or nut has been turned up tight against the plate Z, and the smaller end of the groove preferably projects beyond the periphery of the screw-head, so that a wire may be inserted to dislodge the ball. The operation of these devices is exactly the same as that of those shown in Figs. 1 to 6. It will be understood that the term "nut" as used in the claims will include a screw or bolt head, such as E E', as well as the ordinary forms of nuts.

Without limiting myself to the precise construction and arrangement of parts shown and described, I claim—

1. The combination of a threaded bolt or rod, a nut, and a part to be clamped, one of the opposing faces of the nut and clamped part having one or more tapering tangential grooves opening at their larger ends at the sides of the nut, and a hard ball adapted to fit in one of said grooves and to bear against the opposing face when the nut is screwed up to said part, substantially as described.

2. The combination of a threaded bolt or rod, a nut, and a part to be clamped, one of the opposing faces of the nut and clamped part having one or more tapering tangential grooves opening at both ends at the sides of the nut, and a hard ball adapted to fit in one of said grooves and to bear against the opposing face when the nut is screwed up to said part, substantially as described.

In testimony whereof I affix my signature in presence of two witnesses.

BUTLER EDGAR.

Witnesses:
A. C. SHOEMAKER,
WILLIAM H. BUCHER.